United States Patent
Walker

(10) Patent No.: US 9,982,154 B2
(45) Date of Patent: May 29, 2018

(54) SOLID INK COMPOSITION

(71) Applicant: Electroninks Incorporated, Austin, TX (US)

(72) Inventor: Steven Brett Walker, Austin, TX (US)

(73) Assignee: ELECTRONINKS INCORPORATED, Austin, TX (US)

( * ) Notice: Subject to any disclaimer, the term of this patent is extended or adjusted under 35 U.S.C. 154(b) by 478 days.

(21) Appl. No.: 14/687,248

(22) Filed: Apr. 15, 2015

(65) Prior Publication Data

US 2015/0299489 A1 Oct. 22, 2015

Related U.S. Application Data

(60) Provisional application No. 61/980,951, filed on Apr. 17, 2014, provisional application No. 61/980,827, filed on Apr. 17, 2014.

(51) Int. Cl.
*C09D 11/52* (2014.01)
*C09D 11/34* (2014.01)

(52) U.S. Cl.
CPC ............. *C09D 11/52* (2013.01); *C09D 11/34* (2013.01)

(58) Field of Classification Search
CPC ................................. C09D 11/52; C09D 11/34
USPC .......................................... 106/31.92, 31.61
See application file for complete search history.

(56) References Cited

U.S. PATENT DOCUMENTS

| | | | | |
|---|---|---|---|---|
| 4,681,632 A * | 7/1987 | Bes | ..................... | C09B 67/0092 106/31.61 |
| 5,405,438 A * | 4/1995 | Fujioka | .................. | C09D 11/34 106/31.61 |
| 5,800,600 A * | 9/1998 | Lima-Marques | ...... | C09D 11/34 106/31.61 |
| 7,806,974 B2 * | 10/2010 | Hwang | ................. | C09D 11/102 106/31.92 |
| 8,021,580 B2 | 9/2011 | Ueda et al. | | |
| 8,066,805 B2 | 11/2011 | Zürcher et al. | | |
| 8,734,686 B2 | 5/2014 | Byun et al. | | |
| 9,469,773 B2 * | 10/2016 | Walker | ................... | C09D 11/52 |
| 2002/0068131 A1 * | 6/2002 | Secrest | .................. | C09D 11/34 427/376.1 |
| 2003/0164105 A1 | 9/2003 | Tashiro | | |
| 2004/0026258 A1 | 2/2004 | No et al. | | |
| 2005/0006339 A1 | 1/2005 | Mardilovich et al. | | |
| 2006/0130700 A1 | 6/2006 | Reinartz | | |
| 2008/0145560 A1 | 6/2008 | Khaselev et al. | | |
| 2009/0031856 A1 | 2/2009 | Lee et al. | | |
| 2009/0090273 A1 * | 4/2009 | Heo | ....................... | C09D 11/52 106/31.92 |
| 2009/0120800 A1 | 5/2009 | Chung et al. | | |
| 2009/0209693 A1 | 8/2009 | Suganuma et al. | | |
| 2010/0037731 A1 | 2/2010 | Li | | |
| 2010/0143591 A1 | 6/2010 | Wu et al. | | |
| 2010/0166948 A1 | 7/2010 | Cho et al. | | |
| 2010/0189901 A1 | 7/2010 | Chung et al. | | |
| 2010/0247870 A1 | 9/2010 | Suzuki et al. | | |
| 2011/0005428 A1 | 1/2011 | Heo et al. | | |
| 2011/0059234 A1 | 3/2011 | Byun et al. | | |
| 2011/0232527 A1 | 9/2011 | Kang et al. | | |
| 2012/0168684 A1 | 7/2012 | Magdassi et al. | | |
| 2013/0082217 A1 | 4/2013 | Kang et al. | | |
| 2013/0121872 A1 | 5/2013 | Matsumoto | | |
| 2013/0334470 A1 | 12/2013 | Kurihara et al. | | |
| 2014/0305684 A1 * | 10/2014 | Kang | ..................... | C09D 11/52 252/519.21 |
| 2014/0346412 A1 | 11/2014 | Okamoto et al. | | |
| 2015/0001452 A1 | 1/2015 | Kurihara et al. | | |
| 2015/0004325 A1 | 1/2015 | Walker et al. | | |
| 2015/0132476 A1 * | 5/2015 | Wu | ........................ | C09D 11/52 252/519.21 |
| 2015/0218190 A1 * | 8/2015 | Fujdala | .................. | C09D 11/52 106/31.92 |
| 2017/0107390 A1 * | 4/2017 | Walker | ................... | C09D 11/52 |
| 2017/0210930 A1 * | 7/2017 | Walker | ................... | C09D 11/52 |

FOREIGN PATENT DOCUMENTS

| | | |
|---|---|---|
| DE | 102005038208 A1 | 2/2007 |
| EP | 2156911 A1 | 2/2010 |
| JP | 2009/197133 | 9/2009 |
| JP | 2012/052225 | 3/2012 |
| KR | 20110058307 A | 6/2011 |
| WO | WO 2003/106573 A1 | 12/2003 |
| WO | WO 2011/126706 A2 | 10/2011 |
| WO | WO 2012/168941 A1 | 12/2012 |

OTHER PUBLICATIONS

Analisa Russo, et al., "Pen-on-Paper Flexible Electronics," Advanced Materials 2011, 23, 3426-3430.
S. Brett Walker, et al., "Reactive Silver Inks for Patterning High-Conductivity Features at Mild Temperatures," 2011, Journal of the American Chemical Society, pubs.acs.org/JACS.

* cited by examiner

*Primary Examiner* — Helene Klemanski
(74) *Attorney, Agent, or Firm* — VLP Law Group LLP; David A. Roise

(57) ABSTRACT

The present invention provides an ink composition. The composition comprises a metal ion and a ligand. The ink composition is in a form of solid at a temperature of less than about 30° C. and in a form of liquid at temperature of above about 40 to about 80° C.

28 Claims, No Drawings

SOLID INK COMPOSITION

RELATED APPLICATIONS

This application claims priority to U.S. Provisional Application Ser. No. 61/980,951, filed Apr. 17, 2014, and U.S. Provisional Application Ser. No. 61/980,827, filed Apr. 17, 2014, which are hereby incorporated by this reference.

FIELD OF THE INVENTION

This disclosure is directed to metallic complexes and ink compositions. More particularly, this disclosure provides solid ink compositions. This disclosure also provides a method of making and using ink compositions.

BACKGROUND OF THE INVENTION

Printed electronics offer an attractive alternative to conventional technologies by enabling the creation of large-area, flexible devices at a low cost. There are a plethora of applications for high-conductivity materials with fine-scale features in modern electronics such as solar cell electrodes, flexible displays, radio frequency identification tags, antennas, and many more.

The vast majority of commercially produced conductive inks are specifically designed for inkjet, screen-printing, or roll-to-roll processing methods in order to process large areas with fine-scale features in short time periods. These inks have disparate viscosities and synthesis parameters.

Organometallic complexes have long been used for a number of applications and have recently seen much success and popularity in the field of printed electronics. These complexes are used to create a structure that fully solvates a metallic ion that when deposited and heated creates a conductive, metallic structure. Typically, the inks comprising the metallic complexes are in liquid form at room temperature, which might cause storage and handling problems, and result in short shelf life.

BRIEF SUMMARY

In one aspect, an ink composition includes a metal complex. The metal complex comprises a metal ion and a ligand. The ink composition is in a form of solid at a temperature of less than about 30° C. and is in a form of liquid at temperature of above about 40 to about 80° C.

In another aspect, a method of making an ink composition is disclosed. The method includes providing a ligand precursor in a solid form; heating the ligand precursor so that the ligand precursor liquefies; adding a metal salt to the liquid to form a mixture; and cooling down the mixture to form a solid ink composition.

In yet another aspect, a method of making a conductive structure is disclosed. The method comprises providing a ligand precursor in a solid form; heating the ligand precursor so that the ligand precursor turns liquid; adding a metal salt to the liquid to form a mixture; cooling down the mixture to form a solid ink composition; and heating the solid ink composition to form a conductive structure.

DETAILED DESCRIPTION

Definitions

When describing the compounds, compositions, methods and processes of this disclosure, the following terms have the following meanings, unless otherwise indicated.

The term "alkyl" means a hydrocarbon group that may be linear, cyclic, or branched or a combination thereof having the number of carbon atoms designated (i.e., $C_{1-30}$ means one to thirty carbon atoms). Examples of alkyl groups include methyl, ethyl, n-propyl, isopropyl, n-butyl, t-butyl, isobutyl, sec-butyl, cyclohexyl, cyclopentyl, (cyclohexyl)methyl, cyclopropylmethyl, bicyclo[2.2.1]heptane, bicyclo[2.2.2]octane, etc. Alkyl groups can be substituted or unsubstituted, unless otherwise indicated.

The term "cycloalkyl" refers to saturated monocyclic, bicyclic, tricyclic, or other polycyclic hydrocarbon groups. Any atom can be substituted, e.g., by one or more substituents. A ring carbon serves as the point of attachment of a cycloalkyl group to another moiety. Cycloalkyl groups can contain fused rings. Fused rings are rings that share a common carbon atom. Cycloalkyl moieties can include, e.g., cyclopropyl, cyclobutyl, cyclopentyl, cyclohexyl, cycloheptyl, adamantyl, and norbornyl (bicycle[2.2.1]heptyl).

The term "bulky" means that the size of a large group can produce steric hindrance. A "sterically bulky counter ion" is a counter ion that can produce a steric hindrance.

The term "ligand" refers to a compound that can form one or more bonds to a single metal ion. Examples of a ligand are amines, ethers and thioethers.

The term "aryl" means a polyunsaturated, aromatic hydrocarbon group having 5-10 atoms and forming a single ring (monocyclic, preferably with 6 atoms such as phenyl) or multiple rings (bicyclic (preferably with 10 atoms such as naphthyl) or polycyclic), which can be fused together or linked covalently. Examples of aryl groups include phenyl and naphthalene-1-yl, naphthalene-2-yl, biphenyl and the like. Aryl groups can be substituted or unsubstituted, unless otherwise indicated.

Compositions

This disclosure relates generally to an ink composition comprising a metal ion and a ligand. The ink composition is solid at room temperature and melts at slightly elevated temperatures. This eliminates settling issues and allows the ink to be patterned once heated using inkjet and various other low viscosity techniques. These ink compositions result in stable property and can be patterned and annealed into conductive structures upon heating.

The ink composition generally comprises a metal ion and a waxy ligand. The waxy ligands are typically composed of bulky beta keto carboxylates, substituted dicarboxylates, and tricarboxylates. These metal complexes melt at elevated temperatures, such as for example, at a temperature above about 40° C. to about 80° C. As examples, silver compounds such as substituted silver acetylacetonates, hexafluoroacetylacetonates, and hexafluroacetylacetonate trialkyl phosphine complexes liquefy without decomposition at temperatures exceeding 60° C.

In the present disclosure, any suitable metal ions can be used. In some embodiments, the metal ion is selected from the group consisting of silver, copper, nickel, gold, platinum, palladium, aluminum, magnesium, zinc, and tin ions. In some embodiments, the metal ion is silver.

Any suitable ligands can be used. In some embodiments, the ligand is a bulky ligand. In some embodiments, the ligand is selected from the group consisting of beta keto carboxylates, dicarboxylates, tricarboxylates, substituted acetylacetonates, and trialkyl phosphines.

In some embodiments, the ligand is a ketone wax. Ketone wax can be any suitable ketones including commercially available ketones. The ketone waxes typically have a melting point of from about 40° C. to about 110° C., such as from about 65° C. to about 105° C., such as from about 70° C. to about 100° C. The ketone waxes are present in the ink in any desired or effective amount, such as from about 5 percent by weight of the ink to about 98 percent by weight of the ink, such as from about 15 percent by weight of the ink to about 70 percent by weight of the ink, such as about 50 percent by weight of the ink.

In some embodiments, ketone waxes are alkyl alkyl ketones, alkyl aryl ketones, or aryl aryl ketones.

Preparations

A method of making an ink composition is also disclosed. The method comprises providing a ligand precursor in a solid form; heating the ligand precursor so that the ligand precursor liquefies; adding a metal salt to the liquid to form a mixture; and cooling down the mixture to form a solid ink composition.

In some embodiments, the metal salt is selected from the group consisting of silver, copper, nickel, gold, platinum, palladium, aluminum, magnesium, zinc, and tin salts. In one embodiment, the metal salt is a silver salt. In some embodiments, the metal salt is silver acetate.

In some embodiments, the ligand precursor is in a form of solid and liquefies when heated to a temperature of at least above about 40° C. to about 80° C. In some embodiments, the ligand precursor is selected from the group consisting of beta keto carboxylic acids, substituted dicarboxylic acids, and substituted tricarboxylic acids. In some embodiments, the ligand precursor has several substituents and is bulky.

In some embodiments, the ratio of the metal salt to the ligand precursor is about 1:1 to about 1:4. In some embodiments, the ratio of the metal salt to the ligand precursor is about 1:1 to about 1:2. In some embodiments, the ratio of the metal salt to the ligand precursor is about 1:1.

In some embodiments, the ligand precursor is heated to a temperature of about 40 to about 80° C. to melt into a liquid.

Applications

A method of making a conductive structure is disclosed. The method comprises providing a ligand precursor in a solid form; heating the ligand precursor so that the ligand precursor liquefies; adding a metal salt to the liquid to form a mixture; cooling down the mixture to form a solid ink composition; and heating the solid ink composition to form a conductive structure.

In some embodiments, the ligand precursor is selected from the group consisting of beta keto carboxylic acids, substituted dicarboxylic acids, and substituted tricarboxylic acids. In some embodiments, the ligand precursor has several substituents and bulky.

In some embodiments, the ratio of the metal salt to the ligand precursor is about 1:1 to about 1:4. In some embodiments, the ratio of the metal salt to the ligand precursor is about 1:1 to about 1:2. In some embodiments, the ratio of the metal salt to the ligand precursor is about 1:1. In some embodiments, the solid ink composition is heated to a temperature of about 40° C. to about 80° C.

In some embodiments, the method comprises a step of depositing the ink composition onto a substrate. The substrates may include glass, cellulose acetate, cellophane, polyimide, and polyethylene terephthalate (PET) film.

EXAMPLES

Example 1

Succinic acid was mixed with an equimolar amount of sodium hydroxide to create sodium succinate. The resulting compound was then dissolved and mixed with a 2:1 molar ratio of aqueous silver nitrate. A white precipitate formed and immediately settled to the bottom of the solution. The remaining solvent was decanted and the silver succinate was then dissolved in a ketone wax that had been warmed to 80° C. Upon cooling to room temperature, the silver compound was completely dissolved in the solid resulting in a precursor-based ink in a waxy solid.

Example 2

Another embodiment involved the sodium salt of transglutaconic acid dissolved in a solution of ketones. A solution of silver nitrate with a molar ratio of 2:1 silver nitrate to transglutaconic acid was mixed resulting in a white precipitate that was silver transglutaconate. This is then separated and dissolved in a warm solution of ketone wax.

Many modifications and other embodiments of the present disclosure will come to mind to one skilled in the art to which the present disclosure pertains having the benefit of the teachings presented in the foregoing description; and it will be apparent to those skilled in the art that variations and modifications of the present disclosure can be made without departing from the scope or spirit of the present disclosure. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. An ink composition for making a conductive metal structure, comprising:
   a metal complex comprising:
   a metal ion; and
   a ligand;
   wherein the ink composition is in a form of solid at a temperature of less than about 30° C., and in a form of liquid at a temperature of above about 40 to about 80° C., the liquid comprising the metal in element form resulting from decomposition of the ink composition.

2. The ink composition of claim 1, wherein the ligand is selected from the group consisting of beta keto carboxylates, dicarboxylates, tricarboxylates, substituted acetylacetonates, and trialkyl phosphines.

3. The ink composition of claim 1, wherein the ligand is a ketone wax.

4. The ink composition of claim 1, wherein the metal is selected from the group consisting of silver, copper, nickel, gold, platinum, palladium, aluminum, magnesium, zinc, and tin.

5. The ink composition of claim 1, wherein the metal is silver.

6. The ink composition of claim 1, wherein the ink composition has a metal salt to ligand ratio of about 1:1 to about 1:4.

7. The ink composition of claim 1, wherein the ink composition has a metal salt to ligand ratio of about 1:1 to about 1:2.

8. The ink composition of claim 3, wherein the ketone wax is about 5 percent by weight of the ink to about 98 percent by weight of the ink.

9. The ink composition of claim 3, wherein the ketone wax from about 15 percent by weight of the ink to about 70 percent by weight of the ink.

10. A method of making an ink composition, comprising:
    providing a ligand precursor in a solid form;

heating the ligand precursor so that the ligand precursor liquefies;

adding a metal salt to the ligand liquid to form a mixture; and cooling down the mixture to form a solid ink composition, wherein the ink composition forms a liquid at a temperature of above about 40 to about 80° C., the liquid comprising the metal in element form resulting from decomposition of the ink composition.

11. The method of claim 10, wherein the ligand precursor is selected from the group consisting of beta keto carboxylic acids, substituted dicarboxylic acids, and substituted tricarboxylic acids.

12. The method of claim 10, wherein the ligand precursor is a ketone wax.

13. The method of claim 10, wherein the metal salt is selected from the group consisting of silver, copper, nickel, gold, platinum, palladium, aluminum, magnesium, zinc, and tin salts.

14. The method of claim 10, wherein the ligand precursor is heated to a temperature of about 40 to about 80° C.

15. A method of making an ink composition, comprising:
providing a ligand precursor in a solid form;
heating the ligand precursor so that the ligand precursor liquefies;
adding a metal salt to the ligand liquid to form a mixture; and
cooling down the mixture to form a solid ink composition, wherein the metal salt is a silver salt.

16. The method of claim 15, wherein the metal salt is silver succinate.

17. The method of claim 15, wherein the metal salt is silver transglutaconate.

18. The method of claim 15, wherein the ligand precursor is heated to a temperature of about 40 to about 80° C.

19. A method of making a conductive structure, comprising:
providing a ligand precursor in a solid form;
heating the ligand precursor so that the ligand precursor liquefies;
adding a metal salt to the liquid to form a mixture;
cooling down the mixture to form a solid ink composition; and
heating the solid ink composition to form a conductive structure.

20. The method of claim 19, wherein the solid ink composition is heated to a temperature of about 40 to about 80° C.

21. The method of claim 19, further comprising depositing the ink composition onto a substrate.

22. The method of claim 19, wherein the ligand precursor is selected from the group consisting of beta keto carboxylic acids, substituted dicarboxylic acids, and substituted tricarboxylic acids.

23. The method of claim 19, wherein the ligand precursor is a ketone wax.

24. The method of claim 19, wherein the metal salt is selected from the group consisting of silver, copper, nickel, gold, platinum, palladium, aluminum, magnesium, zinc, and tin salts.

25. The method of claim 19, wherein the metal salt is a silver salt.

26. The method of claim 19, wherein the metal salt is silver succinate.

27. The method of claim 19, wherein the metal salt is silver transglutaconate.

28. The method of claim 19, wherein the ligand precursor is heated to a temperature of about 40 to about 80° C.

* * * * *